(12) United States Patent
Li (10) Patent No.: US 7,991,830 B2
(45) Date of Patent: Aug. 2, 2011

(54) MULTIPLE SESSIONS BETWEEN A SERVER AND MULTIPLE BROWSER INSTANCES OF A BROWSER

(75) Inventor: Richard Ding Li, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 398 days.

(21) Appl. No.: 11/809,636

(22) Filed: May 31, 2007

(65) Prior Publication Data

US 2008/0209050 A1 Aug. 28, 2008

Related U.S. Application Data

(63) Continuation-in-part of application No. 11/713,060, filed on Feb. 28, 2007.

(51) Int. Cl.
*G06F 13/00* (2006.01)
(52) U.S. Cl. ........................................ 709/203
(58) Field of Classification Search .................. 709/203
See application file for complete search history.

(56) References Cited

U.S. PATENT DOCUMENTS

| | | | |
|---|---|---|---|
| 6,954,901 B1 | 10/2005 | Desai et al. | |
| 7,089,243 B1 | 8/2006 | Zhang | |
| 2003/0154398 A1* | 8/2003 | Eaton et al. | 713/201 |
| 2004/0085366 A1* | 5/2004 | Foster et al. | 345/854 |
| 2007/0106748 A1 | 5/2007 | Jakobsson et al. | |
| 2008/0209338 A1 | 8/2008 | Li | |

OTHER PUBLICATIONS

Red Hat, Inc. Office Action for U.S. Appl. No. 11/713,060 mailed Jun. 24, 2009.
Red Hat, Inc. Office Action for U.S. Appl. No. 11/713,060 mailed Jan. 21, 2010.
Red Hat, Inc. Office Action for U.S. Appl. No. 11/713,060 mailed Jun. 23, 2010.
"Stainless: A multi-process browser for OS X Leopard /Snow Leopard" 1 page, © 2008-2010 MD Software, LLC, accessed Oct. 5, 2010 at http://www.stainlessapp.com.
"Stainless: Development Builds" 3 pages, accessed Oct. 5, 2010 at http://www.stainlessapp.com/doc/dev.htm.
"Stainless: Release Notes" 4 pages, accessed Oct. 5, 2010 at http://www.stainlessapp.com/doc/releasenotes.htm.
Red Hat, Inc. Office Action for U.S. Appl. No. 11/713,060 mailed Nov. 30, 2010.
Red Hat, Inc. Advisory Office Action for U.S. Appl. No. 11/713,060 mailed Jan. 25, 2010.

\* cited by examiner

*Primary Examiner* — Robert B Harrell
(74) *Attorney, Agent, or Firm* — Lowenstein Sandler PC (57) ABSTRACT

A method and apparatus for a server capable of supporting multiple sessions with a browser. First session information of a browser is detected. Second session information of the browser is detected. A first session is initiated with a first browser instance of the browser using the first session information. A second session is initiated with a second browser instance of the browser using the second session information.

24 Claims, 7 Drawing Sheets

MULTIPLE SESSIONS BETWEEN A SERVER AND MULTIPLE BROWSER INSTANCES OF A BROWSER

REFERENCE TO RELATED APPLICATION

This application is a continuation in part of application Ser. No. 11/713,060, which was filed on Feb. 28, 2007.

TECHNICAL FIELD

Embodiments of the present invention relate to internet browsing, and more specifically to web browsers in which multiple sessions can be employed, and to web servers that support multiple sessions.

BACKGROUND

Web browsers are an integral part of the internet. Web browsers access information from web servers, and present the information to users in a convenient, easily understood manner.

How a web browser interacts with, and receives data from, web servers depends upon a number of parameters. A first type of parameters may be user selectable from a preferences or options menu of the web browser. These parameters include security preferences, javascript preferences, popup blocking preferences, web viewing preferences, and so on. For each of these parameters, a user can select a specific option (e.g., enable, disable, etc.).

A second type of parameters is a set of data structures that define a user identifying state. Examples of such data structures include a browser history, a browser cache, one or more cookies, etc. Cookies may be the only stateful mechanisms by which a server can store a session state on the browser. Conventional cookies apply to all browser instances.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for a server capable of supporting multiple sessions with a browser. In one embodiment, first session information and second session information of a browser are detected. Detecting the first session information may include receiving a first cookie from the browser, and detecting the second session information may include receiving a second cookie from the browser. The first cookie may include a first browser scope, and the second cookie may include a second browser scope. A first session is initiated with a first browser instance of the browser using the first session information, and a second session is initiated with a second browser instance of the browser using the second session information.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "initiating", "determining", "detecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable storage medium includes any mechanism for storing or transmitting information in a form readable by a machine (e.g., a computer). For example, a machine-readable storage medium includes read only memory ("ROM"), random access memory ("RAM"), magnetic disk storage media, optical storage media, and flash memory devices, etc.

Figure 1A:
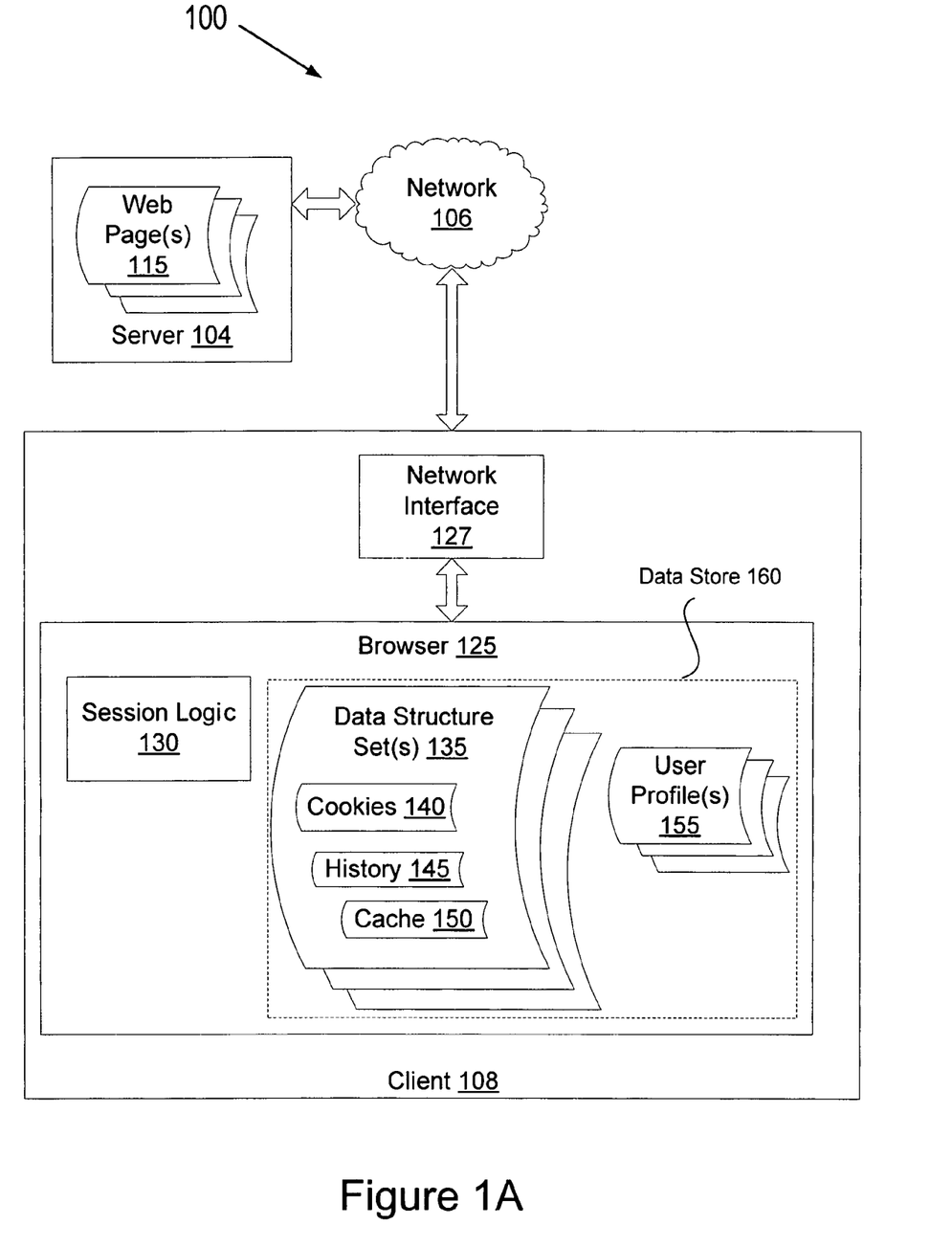
FIG. 1A illustrates an exemplary network architecture, in which embodiments of the present invention may operate.

FIG. 1A illustrates an exemplary network architecture 100, in which embodiments of the present invention may operate. The network architecture 100 may include a client device (client) 108, a server 104 and a network 106. The client 108 and the server 104 are coupled to the network 106, which may be a public network (e.g., Internet) or a private network (e.g., Ethernet or a local area Network (LAN)).

In one embodiment, the server 104 is a web server that provides content such as text, images and other information in the form of web pages 115. The server 104 may accept requests (e.g., HTTP requests) from client 108, and respond by sending responses (e.g., HTTP responses), which may include web pages 115.

The client 108 may be, for example, a personal computer (PC), mobile phone, palm-sized computing device, personal digital assistant (PDA), etc. The client 108 may include a browser 125 and a network interface 127. The network interface 127 is a point of interconnection between the client 108 and the network 106 that enables communication. The network interface 127 may provide wireless connectivity (e.g., Bluetooth, WiFi, etc.) or wired connectivity (e.g., via an Ethernet cable, fiber optic cable, coaxial cable, universal serial bus (USB) cable, firewire cable, etc.). The browser 125 is an application that enables the client 108 to display and interact with text, images, and other information provided by the server 104. The browser 125 may be a web browser configured to display web pages 115.

The browser 125 may communicate with the server 104 via network interface 127 to receive web pages 115 (e.g., by using hypertext transfer protocol (HTTP)). The browser 125 allows a user to navigate between web pages 115 by traversing hyperlinks that connect such web pages 115. The browser 125 may include an ability to view and/or manipulate HTML documents, image formats (e.g., JPEG, PNG, GIF, etc.), and additional information. The browser 125 may also support usenet news, internet relay chat (IRC), email, etc. Protocols supported may include network news transfer protocol (NNTP), simple mail transfer protocol (SMTP), internet message access protocol (IMAP), and post office protocol (POP).

The browser 125 presents data for display based on user identifying state. User identifying state includes information collected by a browser during a user's online activity. User identifying state is contained in a set of data structures that may include, for example, cookies 140, browser cache 150, browser history 145, or any combination of the above. Embodiments of the present invention allow the browser 125 to support different user identifying states. These different user identifying states may be used concurrently with separate browser instances, or consecutively.

In one embodiment, the browser 125 maintains multiple data structure sets 135. In one embodiment, each of the data structure sets 135 is an array of data that contains a user identifying state. Alternatively, each of the data structure sets 135 may be a collection of data in any format. The collection of data may include one or more cookies 140 (data received from a server, and sent back to the server each time it is accessed), a browser history 145 (log of viewed web pages) and a browser cache 150 (images, text, and other web page content cached on the client). Data structure sets 135 may also include additional data such as, for example, bookmarks, stored passwords, stored auto-complete form information, address bar history, etc.

Each of the data structure sets 135 may include data components (e.g., cookies, browser history, browser cache, etc.) whose values are unique to that data structure set. Alternatively, one or more data components may be shared between different data structure sets 135. The data components within a data structure set may affect the presentation and/or functionality of web pages 115 when they are rendered by the browser 125. Therefore, a web page may appear differently for each data structure set, and thus each user identifying state. For example, a single web page may be displayed differently based on two different user identifying states.

In one embodiment, different user identifying states allow a user to have multiple identities when using the same browser 125. That is, server 104 may perceive the user of client 108 as user A when the browser 125 sends a request for content using a first user identifying state. For example, the browser 125 may send a request using a first data structure set having a first cookie. Subsequently, the browser 125 may send another request to the server 104 using a different data structure set which does not include the first cookie. As a result, the server 104 may no longer link this other request to user A but may rather associate it with user B. Hence, when the browser 125 uses different user identifying states to request content from a content provider, the content provider may associate these requests with two different users. As a result, users may have different personas on their machines to protect their privacy, or a programmer can emulate two different users when debugging the operation of a website or a web application.

In another embodiment, different user identifying states enable a user to maintain multiple linked sessions between browser 125 and server 104. Linked sessions are two or more sessions that are each associated with distinct session identifiers (randomly generated unique number used to identify a session), but that share some session information (e.g., user login). For example, a user may log in to server 104 using a first user identifying state to initiate a first session in a first browser instance. A second session may then be initiated between the server 104 and a second browser instance of browser 125 that uses the login established with the first session. The second session may have different session information (e.g., user session preferences that cause server 104 to present a web page in a specified manner) than the first session. A user identifying state may store stateful information about the linked session that is specific to a particular browser instance. Such stateful information may be received from server 104.

In one embodiment, the browser 125 maintains multiple user profiles 155. Each of the user profiles 155 is defined by a unique set of user browser preferences. User browser preferences may include all user customizable browser settings, such as those provided in the "Internet Options" menu of the Internet Explorer® web browser and the "Options" menu of the Mozilla Firefox® web browser. For example, user browser preferences may include webpage viewing preferences, formatting preferences, print preferences, layout preferences, security preferences, popup window blocking preferences, feature enablement preferences, language enablement preferences, etc.

User browser preferences may affect (at least partially) how web pages 115 and other content are presented by the browser 125. For example, a first user profile may include a user browser preference disabling javascript, and a second user profile may include a user browser preference enabling javascript. Web pages 115 may then be presented with javascript features when the browser 125 accesses the server 104 using the second user profile, and may be presented without javascript features when the browser 125 accesses the server 104 using the first user profile.

In one embodiment, the browser 125 maintains a separate data structure set and user profile for each user identity. Accordingly, separate user browser preferences, browser history, browser cache, etc., may be maintained by the browser 125 for each user identity. In another embodiment, a single user identity may include multiple user browser preferences, browser history, cookies, etc. Therefore, for example, a first browser history may be maintained for the browser activity of a first browser instance of a user, and a second browser history may be maintained for the browser activity of a second browser instance of the user. In one embodiment, the browser cache 150 is shared between data structure sets 135 so as to optimize performance (e.g., by increasing the web cache size available to each data structure set).

In one embodiment the data structure sets 135 and user profiles 155 are stored in a data store 160. In one embodiment, data store 160 includes one or more hard drives. Alternatively, data store 160 may include an optical drive, read-only memory (ROM), flash memory, dynamic random access memory (DRAM), a static memory (e.g., flash memory, static random access memory (SRAM), etc.), etc. Data store may be local to client 108, or external to client 108.

In one embodiment, the browser 125 includes a session logic 130 that supports the use of different user identifying states and/or user profiles with different browser instances. In particular, for each browser instance, the session logic 130 may select one of the data structure sets 135 and/or one of the user profiles 155 and use them in a session for this browser instance. The session may be a lasting connection between the client 108 and the server 104, or an intermittent connection whose state is stored at one or both of the client 108 and the server 104.

In one embodiment, the session logic 130 selects a data structure set and/or a user profile automatically. For example, the browser 125 may be configured to use a first data structure set and/or a first user profile when a first website is accessed, and a second data structure set and/or second user profile when a second website is accessed. In another example, browser 125 may be configured to use a first data structure set when a web site is accessed by a first browser instance, and to use a second data structure set when the website is accessed by a second browser instance. Web pages 115 may be categorized into different groups, and a different data structure set and user profile may be used for each group. Examples of web pages that may be combined to form groups include search sites, shopping sites, news sites, etc. Therefore, a first user profile and first user identifying state may automatically apply when search sites are visited, and a second user profile and user identifying state may automatically apply when shopping sites are visited.

In another embodiment, session logic 130 notifies server 104 that browser 125 supports multiple sessions. Session logic 130 may then transmit multiple data structure sets 135 to server 104 upon server request for the initiation of multiple sessions. Server 104 may be aware that the multiple sessions are associated with browser 125. Moreover, the multiple sessions may be linked sessions associated with a single login of a user. For example, a first user profile and first user identifying state may be presented to server 104 for a first instance of browser 125, and a second user profile and second user identifying state may be presented to the server 104 for a second instance of browser 125. The first user identifying state and second user identifying state may share many elements of a data structure set. For example, a first user identifying state and second user identifying state may differ by cookies, but be otherwise the same. Alternatively, many or all of the elements of the data structure sets 135 may be different between user identifying states.

In yet another embodiment, the session logic 130 selects a data structure set and/or a user profile based on user input. A user may be prompted by the session logic 130 to select one or more data structure sets and user profiles when a new session is initiated. The browser 125 may also include a default data structure set and a default user profile that are associated with new sessions unless the user indicates that a different data structure set or user profile are to be used.

The session logic 130 may maintain different sessions simultaneously using browser tabs or browser windows. In one embodiment, the different sessions are linked sessions between browser 125 and server 104. Alternatively, the sessions may be completely distinct sessions between server 104 and browser 125, wherein server 104 does not identify the distinct sessions as belonging to a single client. In one embodiment, the selected data structure set determines how the content is presented by the browser. Alternatively, the selected user profile determines how the content is presented by the browser. In yet another embodiment, both the selected data structure set and the selected user profile determine how the session is presented in the browser instance.

In one embodiment, the session logic 130 provides a unique visual indication for content presentation pertaining to each session based on a selected user identifying state and/or a selected user profile. The unique visual indication may include one or more of a unique color, label, text, and icon. This may enable a user to easily identify which user identifying state and which user profile is associated with each session.

The session logic 130 may generate new user profiles and new user identifying states, and delete existing user profiles and existing user identifying states. In one embodiment, new user profiles and new user identifying states are generated automatically when certain criteria are satisfied. For example, the session logic 130 may be configured to generate a new user profile when a web page is visited for the first time. Alternatively, new user profiles and new user identifying states may be generated upon user request. Once created, new user profiles and new user identifying states may be associated with a session.

In one embodiment, the above described features are natively present in the browser 125. In alternative embodiments, one or more of the above features are implemented in the browser 125 by adding one or more plugins and/or extensions.

Figure 1B:
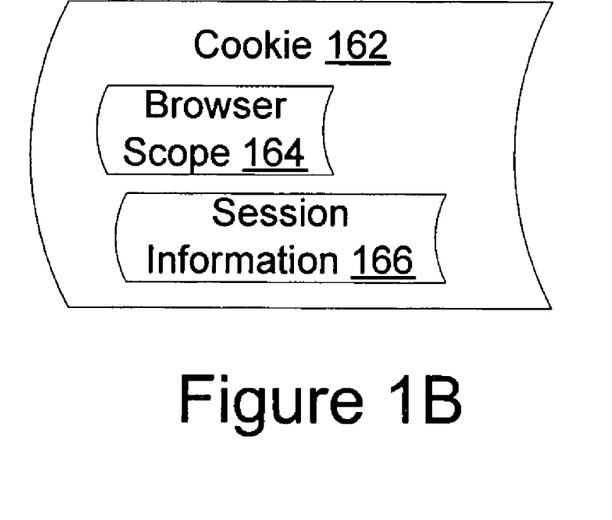
FIG. 1B illustrates an exemplary cookie, in accordance with one embodiment of the present invention.

FIG. 1B illustrates an exemplary cookie 162, in accordance with one embodiment of the present invention. Cookie 162 may be data received from a server and sent back to the server each time the server accessed. In one embodiment, cookie 162 corresponds to one of cookies 140 of FIG. 1A.

Returning to FIG. 1B, in one embodiment cookie 162 includes a browser scope 164 and session information 166 pertaining to one or more sessions. Cookie 162 may also include one or more of a name/value pair, an expiration date, a path, a domain name, encryption information, etc., as known to one of ordinary skill in web site generation and use.

Browser scope 164 may identify to a server one or more browser instances to which cookie 162 applies. For example, browser scope 164 may apply to all browser instances that present content from a server that set cookie 162. In another example, browser scope 164 may apply to a single browser instance. Therefore, if a cookie having this browser scope is used, the cookie would apply to only the browser instance in which it was used. In yet another example, a browser scope 164 may apply to an intermediate number of browser instances. Browser scope 164 may apply, for example, to a browser instance in which it was initially used, and to the subsequent two browser instances that present content from the server that generated cookie 162.

Session information 166 includes information that cause a server to present a web page or web pages in a specified manner (e.g., to send specified data, to highlight specified portions of a web page, etc.). In one embodiment, session information includes user session preferences that allows web pages to be personalized to a user. For example, a first user session preference may indicate that a first stock ticker should be initially displayed, and a second user session preference may indicate that a second stock ticker should be initially displayed. Where different session information 166 is used in different browser instances, a web page may be presented differently in each browser instance.

Figure 1C:
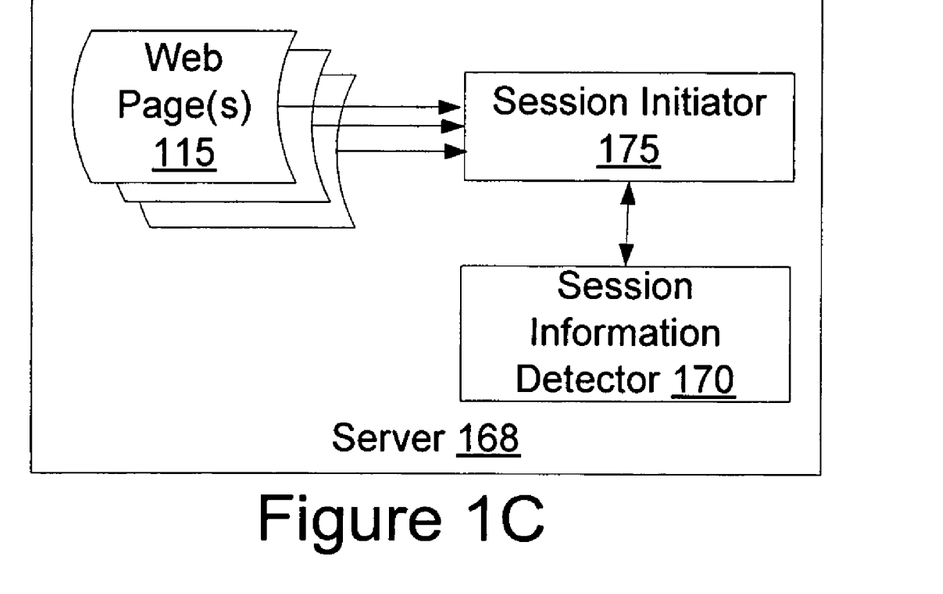
FIG. 1C illustrates an exemplary server, in accordance with one embodiment of the present invention.

FIG. 1C illustrates an exemplary server 168, in accordance with one embodiment of the present invention. In one embodiment, server 168 corresponds to server 104 of FIG. 1A. In one embodiment, server 168 includes a session information detector 170, and a session initiator 175. Server 168 may store web pages 115 or access them from external sources.

Session information detector 170 may detect session information included in cookies received from clients. Session initiator 175 may be coupled to session information detector 170 and web pages 115, and present web pages 115 to a client according to detected session information. In one embodiment, session initiator 175 generates cookies having session information, and sets the generated cookies on a browser of a client. In a further embodiment, the generated cookies also include a browser scope.

Figure 2A:
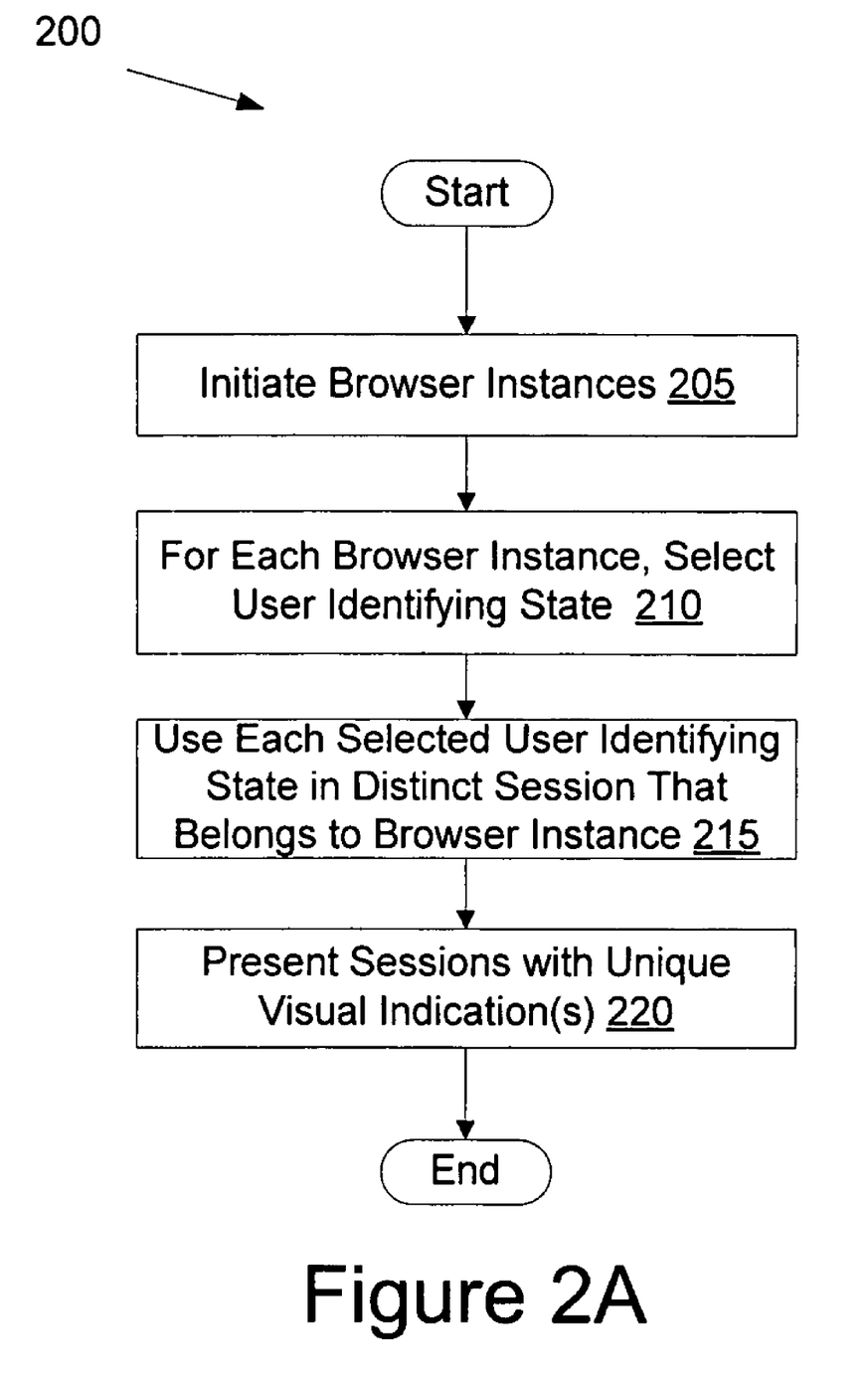
FIG. 2A illustrates a flow diagram of one embodiment for a method of web browsing.

FIG. 2A illustrates a flow diagram of one embodiment for a method 200 of web browsing. The method may be performed by processing logic that may comprise hardware (e.g., circuitry, dedicated logic, programmable logic, microcode, etc.), software (such as instructions run on a processing device), or a combination thereof. In one embodiment, method 200 is performed by the browser 125 of FIG. 1A.

Referring to FIG. 2A, method 200 begins with processing logic initiating multiple browser instances of a browser (block 205). The browser instances may include a first browser instance initiated when the browser is started, and/or subsequent browser instances initiated automatically or based on a user request.

At block 210, for each browser instance, one of multiple user identifying states is selected. The user identifying state may be selected automatically or based on user input. In one embodiment, each user identifying state is defined by a unique set of data structures that may include at least one of a browser history, a browser cache, and one or more cookies.

Existing user identifying states may be selected. Alternatively, a new user identifying state may be created. The new user identifying state may include default user identifying information or information entered by the user.

At block 215, each selected user identifying state is used in a distinct session. In one embodiment, each of the distinct sessions is a session between a client and a first server. Alternatively, some sessions may be between the client and the first server, while other sessions may be between the client and other servers. At block 220, contents associated with the sessions are presented in separate browser instances (e.g., browser tabs or browser windows). Selected user identifying states may determine how contents associated with sessions are presented in the browser instances. In one embodiment, content associated with a session is presented with one or more unique visual indications based on the selected user identifying state. The unique visual indications may include one or more of a unique color, label, text and icon.

Figure 2B:
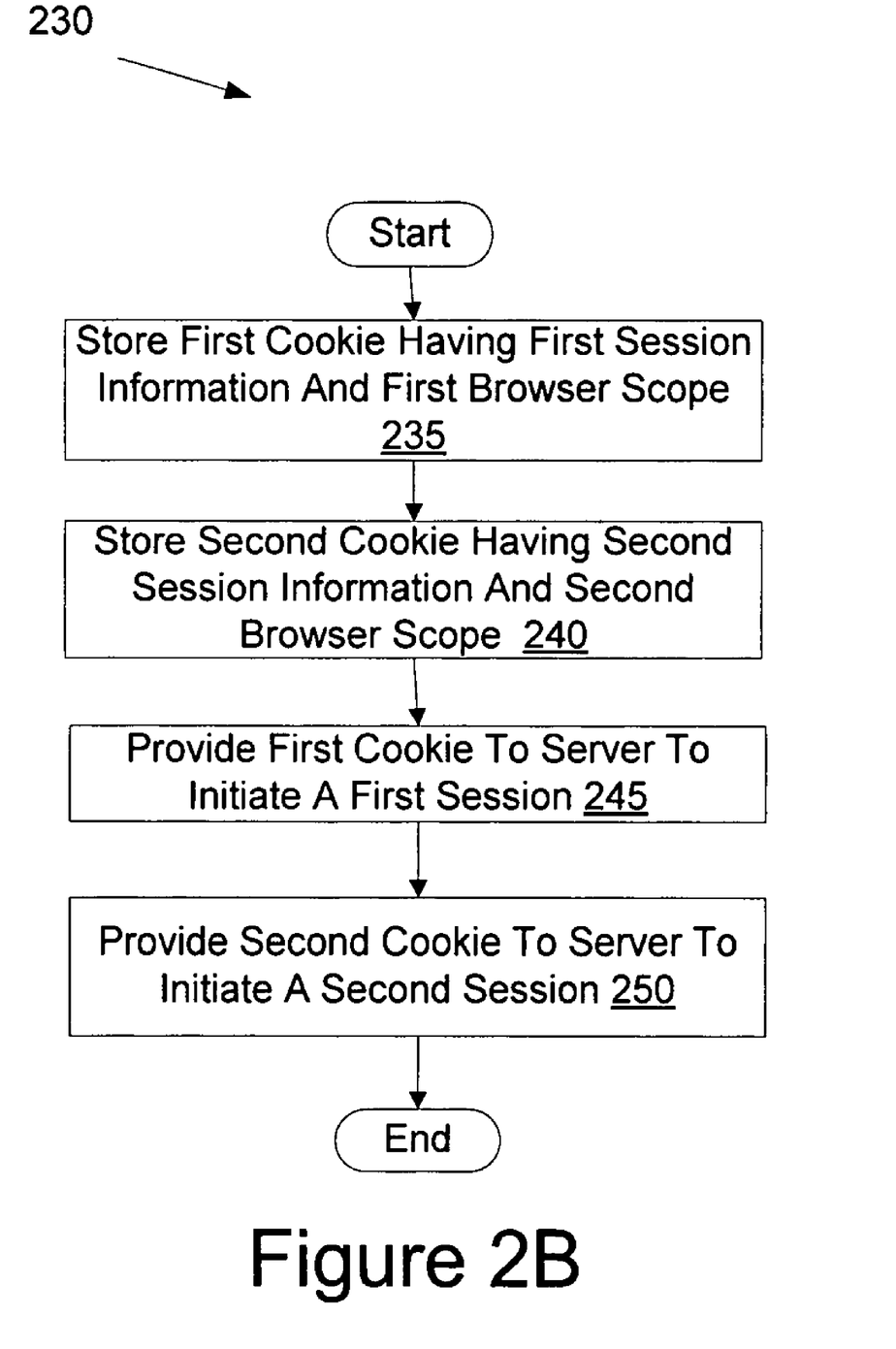
FIG. 2B illustrates a flow diagram of another embodiment for a method of web browsing.

FIG. 2B illustrates a flow diagram of another embodiment for a method 230 of web browsing. The method may be performed by processing logic that may comprise hardware (e.g., circuitry, dedicated logic, programmable logic, microcode, etc.), software (such as instructions run on a processing device), or a combination thereof. In one embodiment, method 230 is performed by the browser 125 of FIG. 1A.

Referring to FIG. 2B, method 230 begins with processing logic storing a first cookie having first session information and a first browser scope (block 235). The first cookie may be stored after it is received from a server. The first browser scope may identify one or more primary browser instances to which the first cookie applies. At block 240, processing logic stores a second cookie having second session information and a second browser scope. The second cookie may be stored after it is received. The second browser scope may identify one or more secondary browser instances to which the second cookie applies.

At block 245, the first cookie is provided (e.g., sent) to a server to initiate a first session between the server and a first browser instance of a browser. At block 250, the second cookie is provided (e.g., sent) to the server to initiate a second session between the server and a second browser instance of the browser. The first session and the second session may be linked sessions associated with a single user login.

Figure 2C:
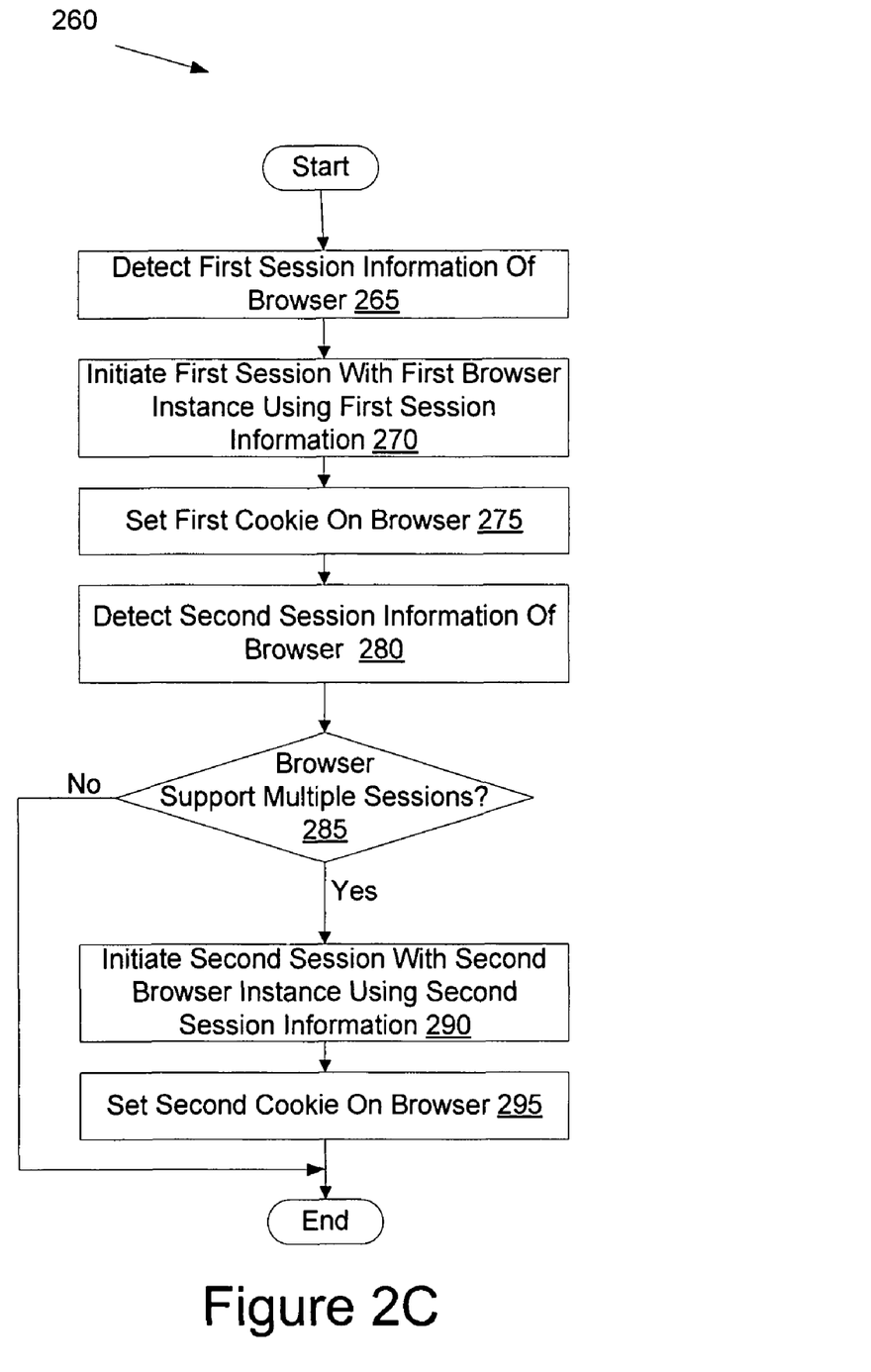
FIG. 2C illustrates a flow diagram of one embodiment of a computer implemented method for a server.

FIG. 2C illustrates a flow diagram of one embodiment of a computer implemented method 260 for a server. The method may be performed by processing logic that may comprise hardware (e.g., circuitry, dedicated logic, programmable logic, microcode, etc.), software (such as instructions run on a processing device), or a combination thereof. In one embodiment, method 260 is performed by server 104 of FIG. 1A.

Referring to FIG. 2C, method 260 begins with processing logic detecting first session information of a browser (block 265). Detecting first session information may include receiving a first cookie from the browser that includes the first session information. The first cookie may also include a first browser scope that identifies one or more primary browser instances to which the first cookie applies. At block 270, a first session is initiated between the server and a first browser instance of the browser using the first session information. At block 275, a cookie is set on the browser that includes first session information and/or first browser scope.

At block 280, processing logic detects second session information of the browser. Detecting second session information may include receiving a second cookie from the browser that includes the second session information. The second cookie may also include a second browser scope that identifies one or more secondary browser instances to which the second cookie applies.

At block 285, processing logic determines whether the browser supports multiple sessions (e.g., based on information previously provided by the browser). If the browser does not support multiple sessions, the method ends. If the browser does support multiple sessions, the method proceeds to block 290.

At block 290, a second session is initiated between the server and a second browser instance of the browser using the second session information. The first session and the second session may be linked sessions. In one embodiment, the first session and second session are each associated with a single user. At block 295, a cookie is set on the browser that includes second session information and/or second browser scope.

Figure 3:
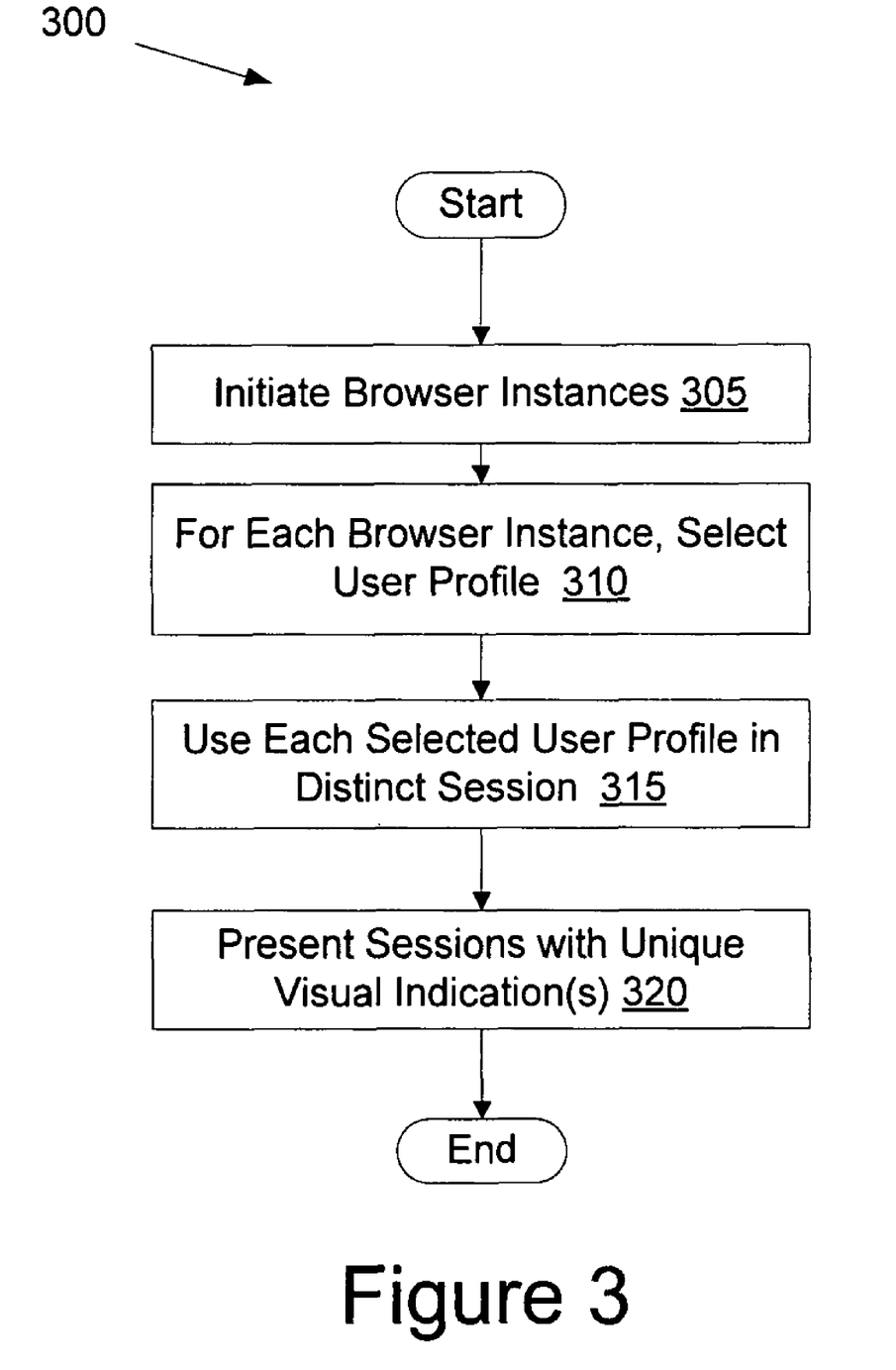
FIG. 3 illustrates a flow diagram of another embodiment for a method of web browsing.

FIG. 3 illustrates a flow diagram of one embodiment for a method 300 of web browsing. The method may be performed by processing logic that may comprise hardware (e.g., circuitry, dedicated logic, programmable logic, microcode, etc.), software (such as instructions run on a processing device), or a combination thereof. In one embodiment, method 300 is performed by the browser 125 of FIG. 1.

Referring to FIG. 3, method 300 begins with processing logic initiating multiple browser instances of a browser (block 305). The browser instances may include a first browser instance initiated when the browser is started and/or subsequent browser instances initiated automatically or based on a user request.

At block 310, for each browser instance, one of multiple user profiles is selected. Each of the plurality of user profiles is defined by a unique set of user browser preferences. In one embodiment, user browser preferences include at least one of a viewing preference, a formatting preference, a print preference, a layout preference, a security preference, a popup window blocking preference, a feature enablement preference, and a language enablement preference (e.g., javascript).

Existing user profiles may be selected, or new user profiles may be created. In one embodiment, a created user profile has default preferences. Alternatively, the user may manually set user browser preferences for the user profile to be created.

At block 315, each selected user profile is used in a distinct session. At block 320, content associated with each session is presented in a browser instance, which may be a browser tab or a browser window. The selected user profiles may determine how the contents associated with the sessions are presented in the browser instances. In one embodiment, one or more unique visual indications are provided for each session based on the selected user profile. The unique visual indications may include one or more of a unique color, label, text and icon.

Figure 4:
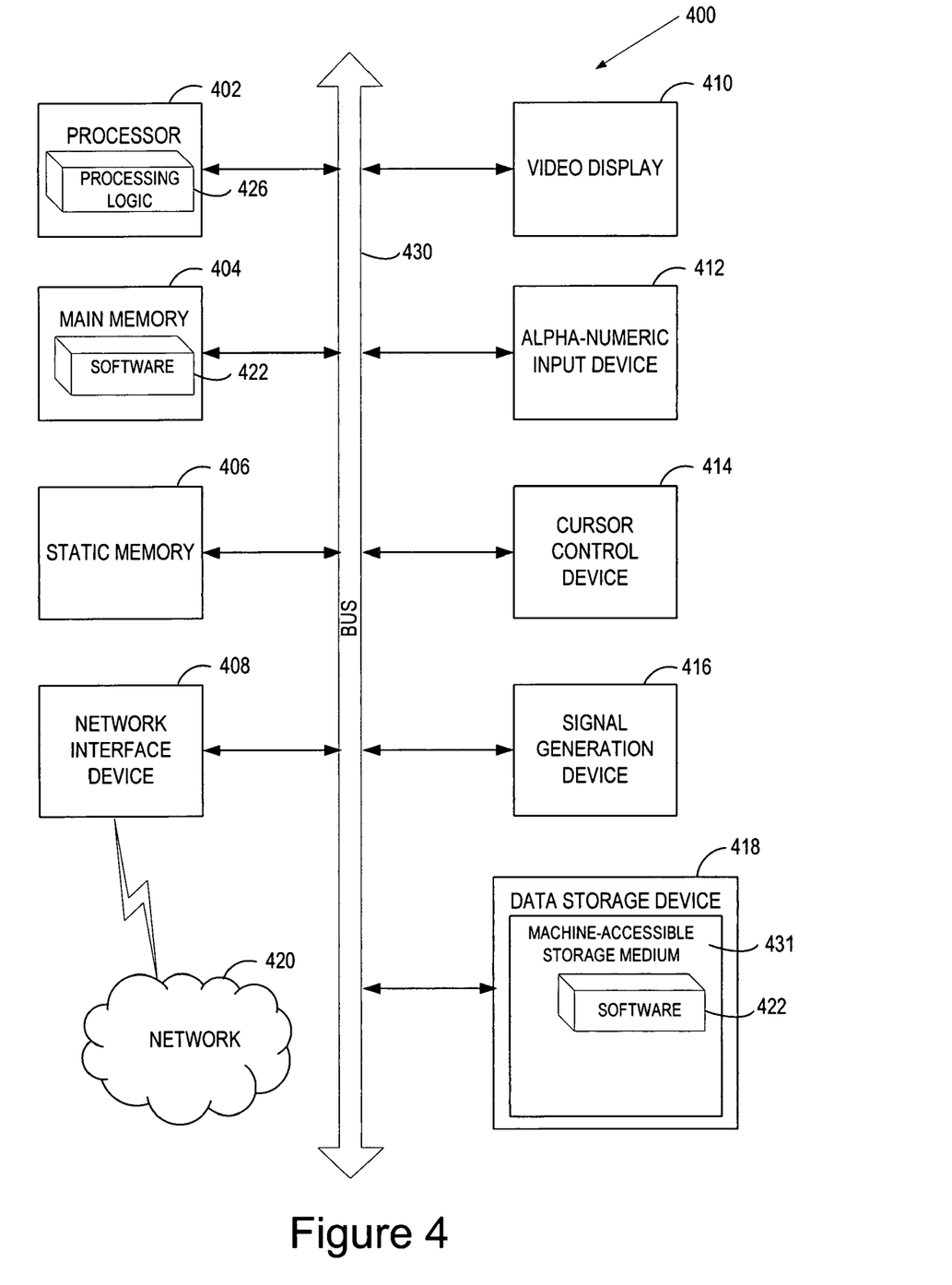
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 431 on which is stored one or more sets of instructions (e.g., software 422) embodying any one or more of the methodologies or functions described herein. The software 422 may also reside, completely or at least partially, within the main memory 404 and/or within the processor 402 during execution thereof by the computer system 400, the main memory 404 and the processor 402 also constituting machine-accessible storage media. The software 422 may further be transmitted or received over a network 420 via the network interface device 408.

The machine-accessible storage medium 431 may also be used to store data structure sets that define user identifying states and user browser preferences that define user profiles. Data structure sets and user profiles may also be stored in other sections of computer system 400, such as static memory 406.

While the machine-accessible storage medium 531 is shown in an exemplary embodiment, the term "machine-accessible storage medium" should be taken to include a single medium or multiple media (e.g., a centralized or distributed database, and/or associated caches and servers) that store the one more sets of instructions. The term "machine-accessible storage medium" shall also be taken to include any medium that is capable of storing or encoding a sequence of instructions for execution by the machine and that cause the machine to perform any one of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A machine-accessible storage medium including data that, when accessed by a machine, cause the machine to perform a method, comprising:

providing, by the machine, first session information and a first browse scope associated with a first user profile and a first user identifying state for a first user to a server to initiate a first session between the server and a first browser instance of a browser running on the client computer system, the first session information including first user preferences and the first browser scope being a property of a first cookie and identifying one or more primary browser instances to which the first session information applies; and while the browser is running on the computer system and the first session is active, providing second session information and a second browser scope associated with a second user profile and a second user identifying state for a second user that is different from the first user to the server to initiate a second session between the server and a second browser instance of the browser running on the client computer system, the second session information including second user preferences and the second browser scope being a property of a second cookie and identifying one or more secondary browser instances to which the second session information applies.

2. The machine-accessible storage medium of claim 1, wherein providing the first session information and the first browser scope includes sending the first cookie that includes the first session information and the first browser scope to the server, and providing the second session information and the second browser scope includes sending the second cookie that includes the second session information and the second browser scope to the server.

3. The machine-accessible storage medium of claim 2, further comprising:
storing the first cookie in a first directory associated with the first user profile and storing the second cookie in a second directory associated with the second user profile.

4. The machine-accessible storage medium of claim 1, wherein the first session information and the second session information are associated with a single user login.

5. A server apparatus comprising:
a memory to store instructions for a web server; and
a processor, connected to the memory, to execute the instructions, wherein the instructions cause the processor to:
detect first session information associated with a first user profile and a first user identifying state for a first user of a browser running on a client device, the first user profile comprising first user preferences and the first user identifying state comprising at least one of a first cookie, a first browser history or a first browser cache;
initiate a first session with a first browser instance of the browser using the first session information; and
while the browser is running on the client device and the first session is active, detect second session information associated with a second user profile and a second user identifying state for a second user different from the first user of the browser, the second user profile comprising second user preferences and the second user identifying state comprising at least one of a second cookie, a second browser history or a second browser cache, and initiate a second session with a second browser instance of the browser using the second session information.

6. The apparatus of claim 5, wherein detecting the first session information includes receiving the first cookie from the browser, and detecting the second session information includes receiving the second cookie from the browser, wherein the first cookie is associated with the first user profile and the first browser instance and the second cookie is associated with the second user profile and the second browser instance.

7. The apparatus of claim 6, wherein the first cookie includes a first browser scope that identifies one or more primary browser instances to which the first cookie applies, and the second cookie includes a second browser scope that identifies one or more secondary browser instances to which the second cookie applies.

8. The apparatus of claim 5, wherein the instructions further cause the processing device to determine whether the browser supports multiple concurrent sessions, and to initiate the second session upon determining that the browser supports multiple concurrent sessions.

9. The apparatus of claim 5, further comprising the instructions to cause the processing device to:
set the first cookie on the browser, the first cookie including the first session information and a first browser scope, wherein the first browser scope identifies one or more primary browser instances to which the first cookie applies, the one or more primary browser instances including the first browser instance, and to set the second cookie on the browser, the second cookie including the second session information and a second browser scope, wherein the second browser scope identifies one or more secondary browser instances to which the second cookie applies, the one or more secondary browser instances including the second browser instance.

10. A method implemented by a client computer system programmed to perform the following, comprising:
providing, by the client computer system, first session information and a first browser scope associated with a first user profile and a first user identifying state for a first user to a server to initiate a first session between the server and a first browser instance of a browser running on the client computer system, the first session information including first user preferences and the first browser scope being a property of a first cookie and identifying one or more primary browser instances to which the first session information applies; and
while the browser is running on the computer system and the first session is active, providing second session information and a second browser scope associated with a second user profile and a second user identifying state for a second user that is different from the first user to the server to initiate a second session between the server and a second browser instance of the browser running on the client computer system, the second session information including second user preferences and the second browser scope being a property of a second cookie and identifying one or more secondary browser instances to which the second session information applies.

11. The method of claim 10, wherein providing the first session information and the first browser scope includes sending the first cookie that includes the first session information and the first browser scope to the server, and providing the second session information and the second browser scope includes sending the second cookie that includes the second session information and the second browser scope to the server.

12. The method of claim 11, further comprising:
storing the first cookie in a first directory associated with the first user profile and storing the second cookie in a second directory associated with the second user profile.

13. The method of claim 10, wherein the first session information and the second session information are associated with a single user login.

14. A client apparatus, comprising:
a memory to store instructions for a browser; and
a processor, connected to the memory, to execute the instructions, wherein the instructions cause the processor to:
store first session information and a first browser scope identifying one or more primary browser instances to which the first session information applies, and store second session information and a second browser scope identifying one or more secondary browser instances to which the second session information applies, the first session information including first user preferences and being associated with a first user profile and a first user identifying state for a first user, the first browser scope being a property of a first cookie, the second session information including second user preferences and being associated with a second user profile and a second user identifying state for a second user that is different from the first user, and the second browser scope being a property of a second cookie; and
during runtime of the browser, communicate the first session information and first browser scope to a server to initiate a first session between the server and a first browser instance of the browser, and during the runtime of the browser, while the first session is active, communicate the second session information and second browser scope to the server to initiate a second session between the server and a second browser instance of the browser.

15. The apparatus of claim 14, wherein the first session information and the first browser scope are included in the first cookie, and the second session information and the second browser scope are included in the second cookie.

16. The apparatus of claim 15, further comprising:
a data store having a first directory associated with the first user profile to store the first cookie and a second directory associated with the second user profile to store the second cookie.

17. A method implemented by a server computer system programmed to perform the following, comprising:
detecting, by the server computer system, first session information associated with a first user profile and a first user identifying state for a first user of a browser running on a client device, the first user profile comprising first user preferences and the first user identifying state comprising a first cookie, a first browser history and a first browser cache, wherein detecting the first session information comprises receiving the first cookie from the browser;
initiating, by the server computer system, a first session with a first browser instance of the browse sing the first session information;
receiving notification that the browser supports multiple sessions; and
while the browser is running on the client device and the first session is active, performing the following after determining that the browser supports multiple concurrent sessions:
detecting, by the server computer system, second session information associated with a second user profile and a second user identifying state for a second user different from the first user of the browser running on the client device, the second user profile comprising second user preferences and the second user identifying state comprising a second cookie, a second browser history and a second browser cache, wherein detecting the second session information includes receiving a second cookie from the browser; and
initiating, by the server computer system, a second session with a second browser instance of the browser using the second session information.

18. The method of claim 17, wherein the first cookie includes a first browser scope that identifies one or more primary browser instances to which the first cookie applies, and the second cookie includes a second browser scope that identifies one or more secondary browse instances to which the second cookie applies.

19. The method of claim 17, further comprising:
setting the first cookie on the browser, the first cookie including the first session information and a first browser scope, wherein the first browser scope identifies one or more primary browser instances to which the first cookie applies, the one or more primary browser instances including the first browser instance; and
setting the second cookie on the browser, the second cookie including the second session information and a second browser scope, wherein the second browser scope identifies one or more secondary browser instances to which the second cookie applies, the one or more secondary browser instances including the second browser instance.

20. The method of claim 17, wherein the second session is linked with the first session, wherein linked sessions share at least some session information and have at least some additional session information that differs.

21. A machine-accessible storage medium including data that, when accessed by a machine, cause the machine to perform a method, comprising:
detecting, by the machine, first session information associated with a first user profile and a first user identifying state for a first user of a browser running on a client device, the first user profile comprising first user preferences and the first user identifying state comprising at least one of a first cookie, a first browser history or a first browser cache, wherein detecting the first session information comprises receiving the first cookie from the browser;
initiating, by the server computer system, a first session with a first browser instance of the browser using the first session information; and
while the browser is running on the client device and the first session is active, performing the following:
detecting, by the server computer system, second session information associated with a second user profile and a second user identifying state for a second user different from the first user of the browser running on the client device, the second user profile comprising second user preferences and the second user identifying state comprising at least one of a second cookie, a second browser history or a second browser cache, wherein detecting the second session information includes receiving a second cookie from the browser; and
initiating, by the server computer system, a second session with a second browser instance of the browser using the second session information.

22. The machine-accessible storage medium of claim 21, the method further comprising:
initiating the second session after determining that the browser supports multiple concurrent sessions.

23. The machine-accessible storage medium of claim 21, wherein the first cookie includes a first browser scope that identifies one or more primary browser instances to which the first cookie applies, and the second cookie includes a second browser scope that identifies one or more secondary browser instances to which the second cookie applies.

24. The machine-accessible storage medium of claim 21, the method further comprising:
   setting the first cookie on the browser, the first cookie including first session information and a first browser scope, wherein the first browser scope identifies one or more primary browser instances to which the first cookie applies, the one or more primary browser instances including the first browser instance; and
   setting the second cookie on the browser, the second cookie including the second session information and a second browser scope, wherein the second browser scope identifies one or more secondary browser instances to which the second cookie applies, the one or more secondary browser instances including the second browser instance.

* * * * *